March 17, 1953 — H. S. RAINBOW — 2,631,427
GAS TURBINE UNIT, PARTICULARLY FOR DRIVING ROAD MOTOR VEHICLES
Filed July 24, 1950 — 5 Sheets-Sheet 1

INVENTOR
H. S. RAINBOW

INVENTOR
H. S. RAINBOW
BY
Mawhinney & Mawhinney
ATTYS.

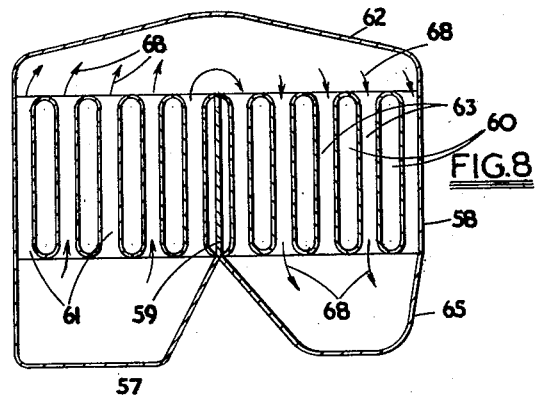
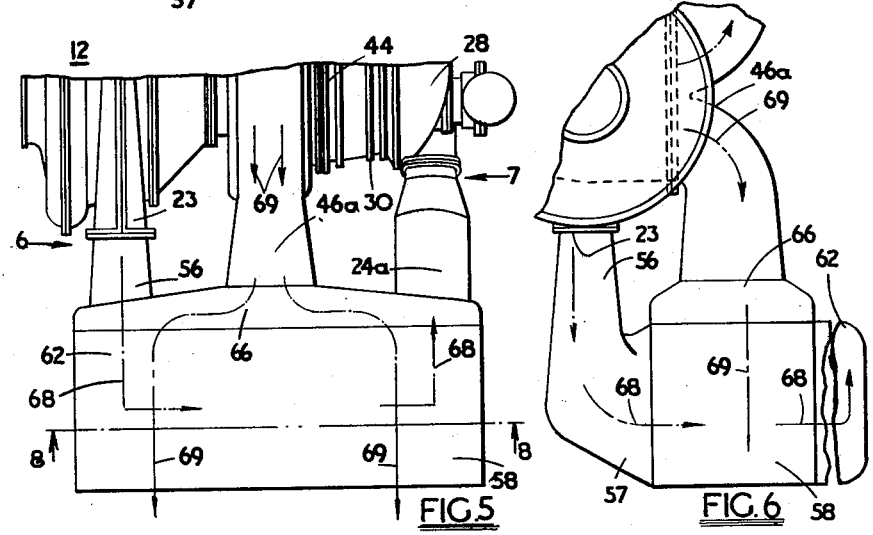
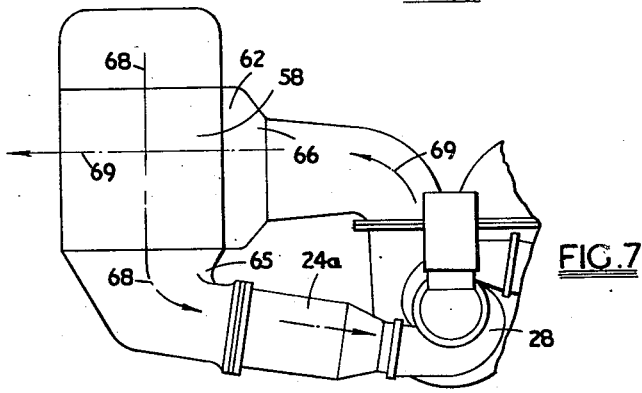

Patented Mar. 17, 1953

2,631,427

UNITED STATES PATENT OFFICE 2,631,427

GAS TURBINE UNIT, PARTICULARLY FOR DRIVING ROAD MOTOR VEHICLES

Horace S. Rainbow, Coventry, England, assignor to Armstrong Siddeley Motors Limited, Coventry, England Application July 24, 1950, Serial No. 175,526
In Great Britain August 11, 1949

4 Claims. (Cl. 60—39.16)

1

The main object of the present invention is to provide a satisfactory gas turbine unit, for driving a road motor-vehicle, which can be installed substantially in the space normally allocated for the power unit of a road motor-vehicle. That is to say, the gas turbine unit should be a compact one, and of light weight, with the various components appropriately arranged.

According to the invention, the unit comprises a centrifugal compressor at the front delivering compressed air to a combustion chamber which is connected at its outlet end to a reversing-flow volute chamber supplying the products of combustion and diluent air forwardly to an axial-flow turbine which is coaxial with the compressor, and the turbine comprises independent rotors respectively connected to drive the compressor rotor and a reduction gearing, positioned between the compressor and turbine and to one side of the drive shaft leading to the compressor, for an output shaft.

In the accompanying drawings:

Figure 5 is a fragmentary plan of a modified form of unit incorporating a heat exchanger;

Figures 6 and 7 are fragmentary end elevations looking in the directions, respectively, of the arrows 6 and 7 in Figure 5.

Figure 8 is a section taken mainly on the line 8—8 of Figure 5;

Figure 9 is a plan of another modification; and

Figure 10 is a side elevation thereof.

Figure 1:
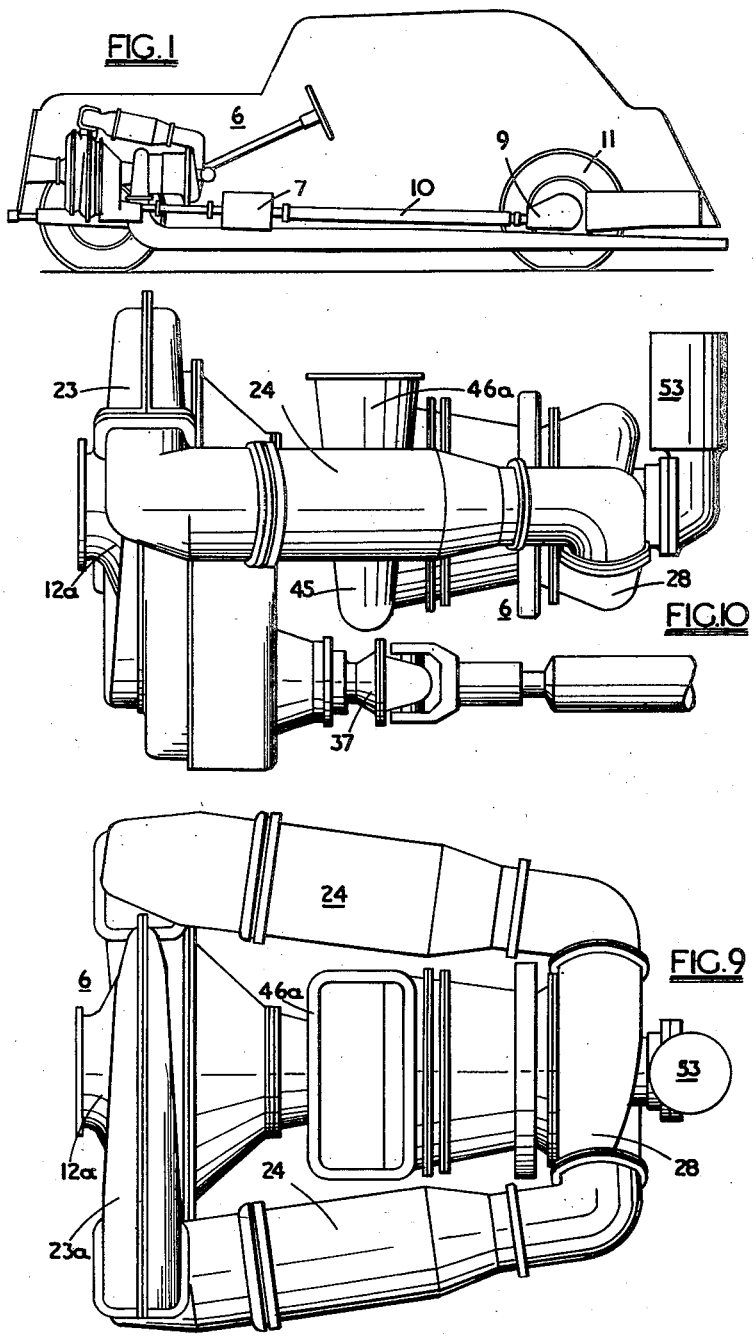
Figure 1 is an outline elevation of a motor car powered by a gas turbine unit according to the invention.

In Figure 1 the unit 6 is mounted at the front of the vehicle, and it drives through a transmission system 7 (which may include a clutch and a reversing gear) and a propeller shaft assembly 10 to any usual form of differential gearing 9 through which the rear wheels 11 are driven.

Figure 2:
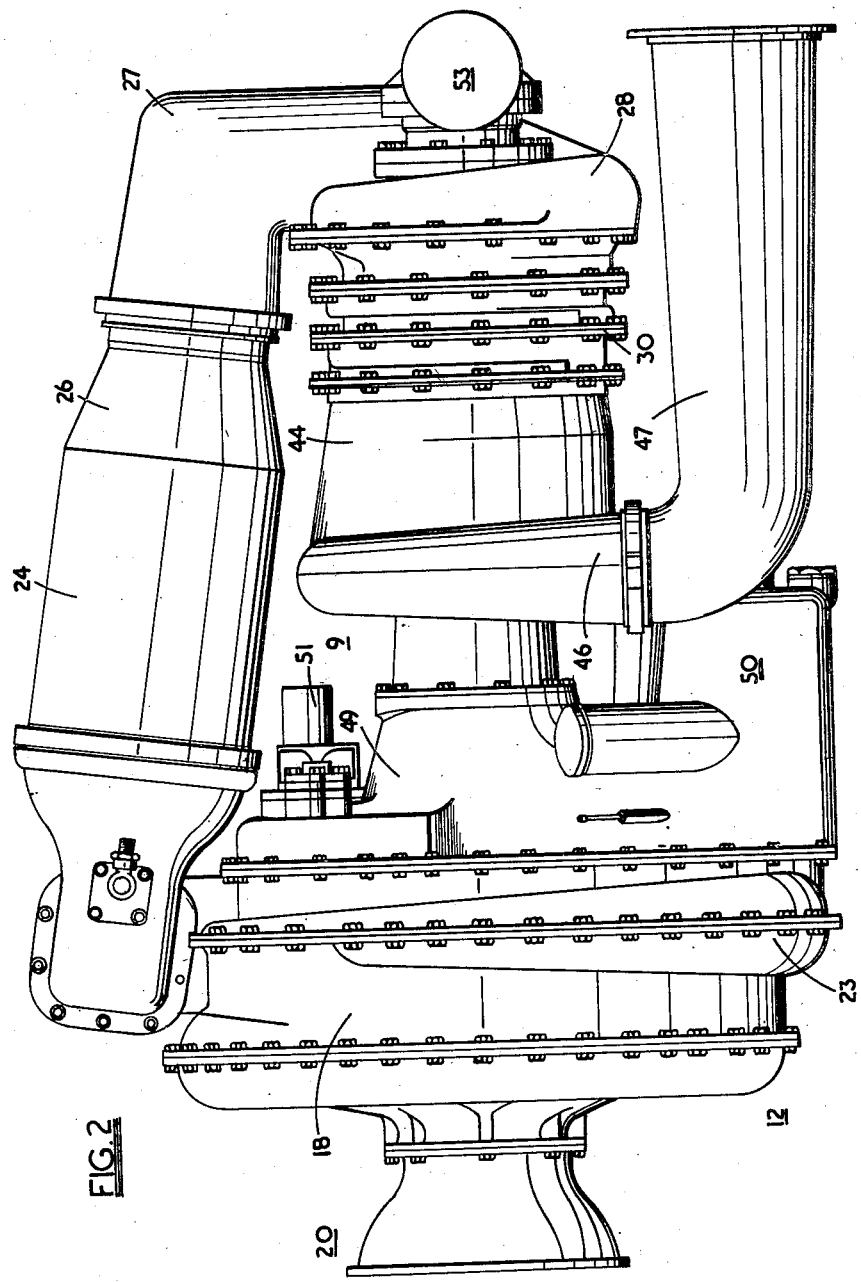
Figure 2 is a side elevation of the gas turbine unit.
Figure 4:
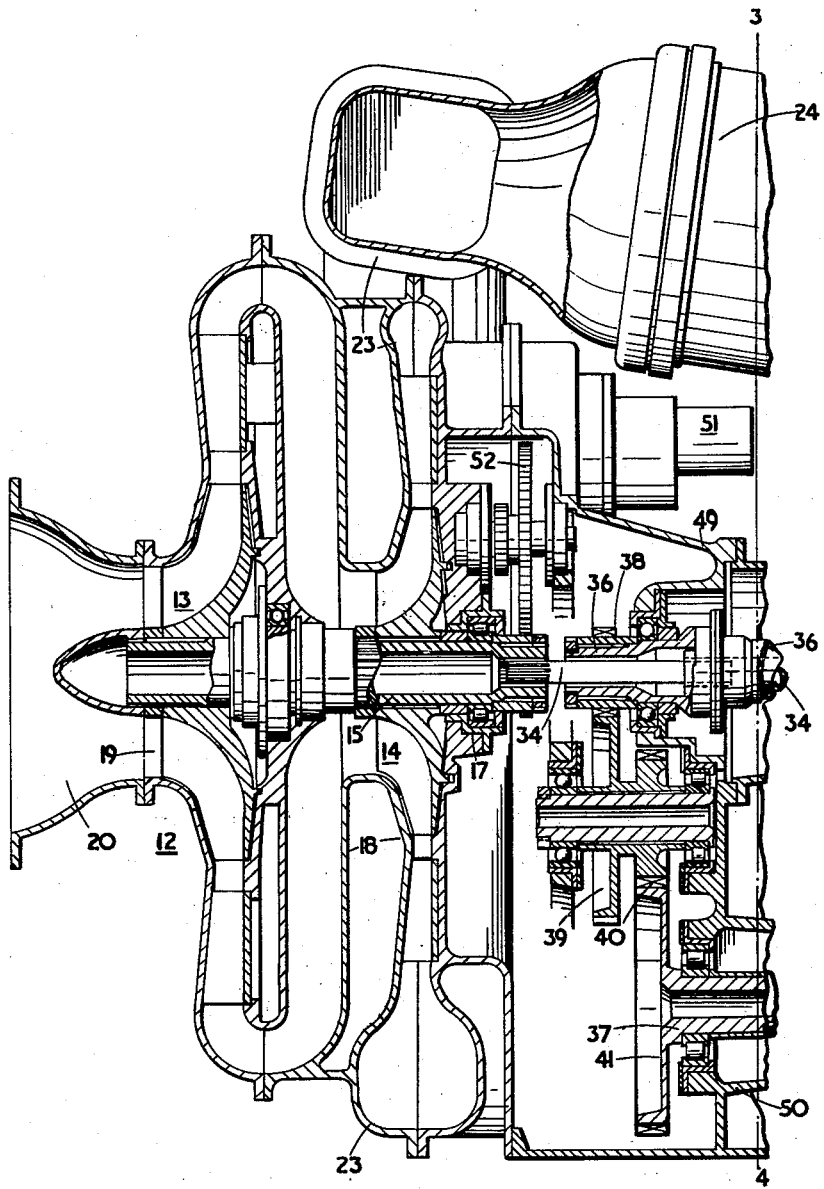

In the construction of Figures 2 and 4 the compressor 12 is a two-stage one adapted to provide a compression ratio of, say, 5 to 1. It is shown as comprising two centrifugal impellers 13, 14 fast on a shaft 15 which is journalled, at 16, 17 in the stationary casing 18. The inlet 19 to the compressor preferably extends all the

2 way around the periphery; and it is shown as being connected by a duct 20 to the front end of the vehicle, to a position such as would normally be occupied by the radiator of a water-cooled power unit for the vehicle.

The compressed air, after passing through an annular diffuser casing 23 for the second stage of the compressor, is led from the top of this casing to the adjacent end of a single combustion chamber 24 arranged at the top of the unit and extending longitudinally, though it may be inclined downwardly from the front as shown, the combustion chamber and ducting lying well within the overall length of the unit.

The outlet end 26 of the combustion chamber is connected by an elbow 27 to a volute chamber 28 which forms the rear end of the unit, and in this chamber the products of combustion and diluent air are reversed in direction. This mixture is then led through guide vanes 29, at the forward end of the volute chamber and at a less radius from the compressor axis than is the outlet end 26 of the combustion chamber, to the stator casing 30 of a turbine which houses three turbine wheels coaxial with the compressor.

The first two of these turbine wheels, i. e., the rearmost two, 32, 33, are mounted on a shaft 34 extending to the compressor shaft 15, to drive the compressor rotors. The third turbine wheel 35 is the power turbine wheel. It drives a hollow shaft 36 extending forwardly, round the compressor driving shaft 34, to a reduction gearing which is adjacent the second stage diffuser casing 23 of the compressor and which is mainly on the side of the axis of the unit remote from the combustion chamber. The reduction gearing, which drives a rearwardly-extending output shaft 37 connected to the propeller shaft assembly 10, includes a pinion 38 on the shaft 36 driving a layshaft gear wheel 39, the latter being fast with a pinion 40 driving a gear wheel 41 fast on the shaft 37.

The exhaust from the turbine is led into an annular, forwardly-extending and diverging duct 44 which terminates in a volute chamber 45 having a twin outlet. The two limbs 46 of this outlet extend downwardly and rearwardly at each side of the unit, and are connected to exhaust pipes 47 which initially extend rearwardly substantially parallel to the output shaft 37.

Thus, the reduction gearing can be mounted in a casing 49 rearwardly of the compressor, such casing being well away from the high temperature of the turbine system and conveniently providing bearings for the shafts 34 and 36, as well as supports for the reduction gearing, whilst a rearward extension 50 of this casing supports the output shaft. In the space round this casing may be mounted certain auxiliaries, such as a governor, a fuel pump and an oil pump, indicated in outline at 51, and drives for these can be conveniently arranged from the interior of the casing, as indicated at 52. The starter motor 53 may be disposed to be at right-angles to the tail end of the compressor-driving shaft 34, so that in starting up the power turbine wheel 35 is not rotated.

It will be seen that this layout provides a desirably low propeller shaft, and also a satisfactory exhaust system which can be led rearwardly, as in the case of a present-day motor-vehicle. The overall length of the unit can be kept relatively short, thus providing a compact and neat unit of relatively-light weight.

In the modification of Figures 5 to 8 the gas turbine unit is substantially the same as that of Figures 1 to 4, particularly as regards the compressor and the turbine, and parts marked 12, 23, 28, 30 and 44, correspond to those so marked Figures 1 to 4. In Figures 5 to 8, however, the output from the volute chamber 23 of the compressor is delivered by a duct 56 to an air casing 57 which is below the left-hand end (Figure 5) of a heat exchanger unit 58, the casing 57 extending up to the central partition 59 thereof. The heat exchanger unit has a number of spaced passages 60, 60 extending horizontally across it, leaving between them, at the left hand side (Figures 5 and 8) of the unit, parallel passages 61, 61 through which the compressor output travels upwardly from the casing 57 to a receiving chamber 62 placed over and extending the whole length of the unit 58. In a similar way, at the right hand end (Figures 5 and 8) of the heat exchange unit, the compressed air travels downwardly through parallel passages 63, 63 spaced from one another by the passages 60 in the right hand half, and from there it enters the inlet end 65 of a combustion chamber 24a leading to the volute chamber 28 from which the turbine is supplied. The exhaust from the turbine travels along the duct 46a communicating with a receiving chamber 66, which extends along the whole length of the adjacent side of the heat exchange unit 58, communicating with the adjacent ends of all the passages 60 through which the exhaust gases pass horizontally, thereby heating the compressed air on its way from the compressor to the combustion chamber 24a. The arrows 68 partly denote the movement of the air from the compressor until it reaches the combustion chamber, the arrows 69 denoting the direction of the exhaust gases.

In this construction it is preferred that there should be two oppositely disposed combustion chambers 24a and heat exchangers similar to that described above.

Figure 3:
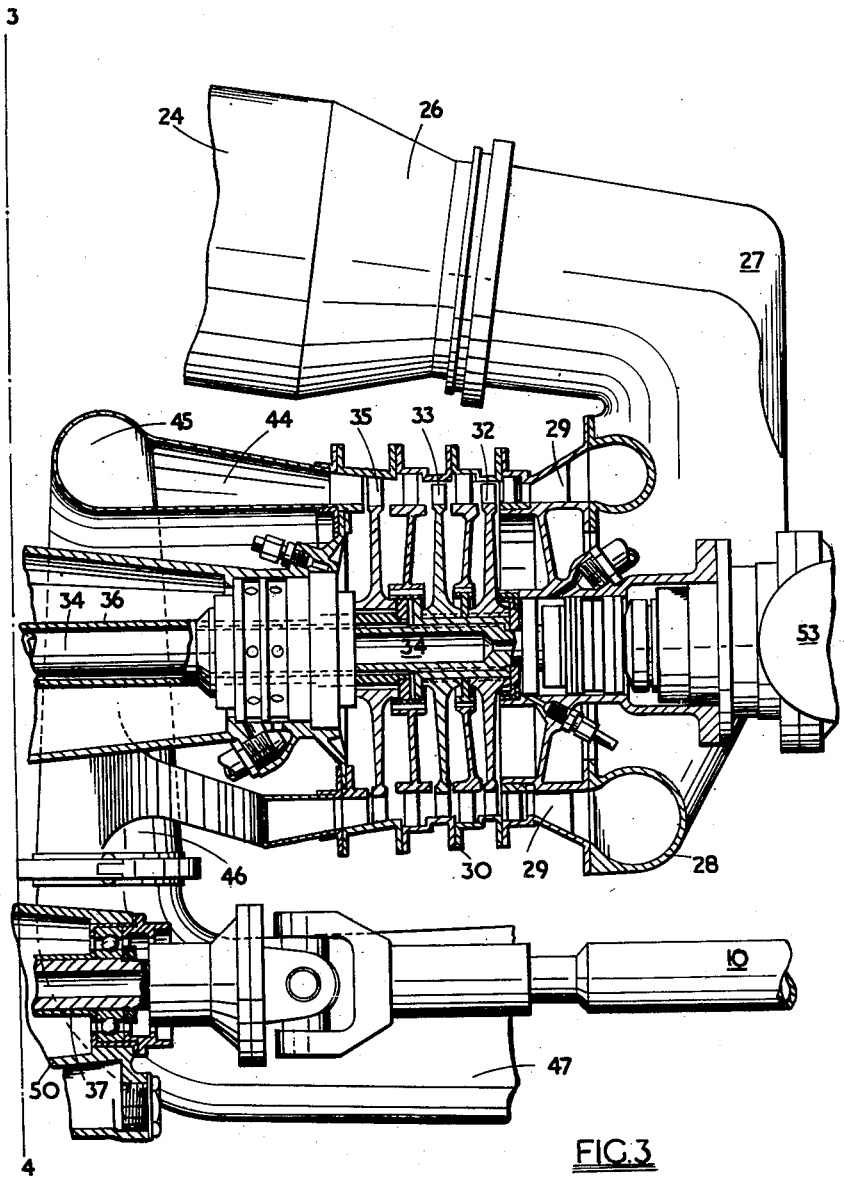
Figures 3 and 4 are sectional elevations, to a larger scale of the turbine and compressor, respectively, the chain line 3—4 being common to both figures.

The modification of Figures 9 and 10 differs from that of Figures 2 to 4 mainly in that the compressor, 12a, is a single stage one, and in that there are two combustion chambers 24 disposed on opposite sides of the unit 6 and each connected to be supplied from the volute chamber 23, their outlet ends being connected to the reversing volute chamber 28. Furthermore, in this modification, the outlet volute chamber 45 of the turbine has a single upwardly extending outlet 46a to be connected to an appropriate exhaust pipe.

What I claim as my invention and desire to secure by Letters Patent of the United States is:

1. A gas turbine unit comprising a centrifugal compressor, at one end of the unit, having a rotor, at least one longitudinally-extending combustion chamber having its inlet end connected to the outlet of said compressor, a reversing-flow volute chamber, at the other end of the unit, having its inlet end connected to the outlet end of said combustion chamber, an axial flow turbine coaxial with said compressor, the inlet end of said turbine being adjacent and connected to the outlet of said volute chamber, a reduction gearing positioned between the compressor and the turbine and angularly spaced from said combustion chamber, and an output shaft driven by said reduction gearing, said turbine having two independent coaxial rotors arranged end to end with the one remote from the compressor connected to drive the compressor rotor and with the one adjacent the compressor connected to drive said reduction gearing.

2. A gas turbine unit comprising a centrifugal compressor, at one end of the unit, having a rotor, an exhaust-heated heat exchanger unit having its inlet end connected to the outlet of said compressor, a combustion chamber having its inlet end connected to the outlet of said heat exchanger, a reversing-flow volute chamber, at the other end of the unit, having its inlet end connected to the outlet end of said combustion chamber, an axial flow turbine coaxial with said compressor, the inlet end of said turbine being adjacent and connected to the outlet of said volute chamber, a reduction gearing positioned between the compressor and the turbine and angularly spaced from said heat exchanger, and an output shaft driven by said reduction gearing, said turbine having two independent coaxial rotors arranged end to end with the one remote from the compressor connected to drive the compressor rotor and with the one adjacent the compressor connected to drive said reduction gearing.

3. A gas turbine unit comprising a centrifugal compressor having a rotor, at least one combustion chamber connected to be supplied with compressed air from said compressor, a reversing-flow volute chamber having its inlet end connected to the outlet end of said combustion chamber, an axial flow turbine coaxial with said compressor, the inlet end of said turbine being adjacent and connected to the outlet of said volute chamber, said turbine having two independent rotors, a reduction gearing positioned between the compressor and the turbine but to one side of the common axis thereof, a shaft means connecting the first of said independent rotors to the compressor rotor, a tubular shaft encircling said shaft means and connecting the second of said independent rotors to said reduction gearing, and an output shaft driven by said reduction gearing.

4. A gas turbine unit comprising a centrifugal compressor, at one end of the unit, having a rotor, at least one combustion chamber connected to receive compressed air from said compressor, a reversing-flow volute chamber, at the other end of the unit, having its inlet end connected to the outlet end of said combustion chamber, an axial flow turbine coaxial with said compressor, the inlet end of said turbine being adjacent and connected to the outlet of said volute chamber, said turbine having two independent coaxial rotors arranged end to end, the turbine rotor nearer said volute chamber being a multi-stage one, a shaft means interconnecting said multi-stage rotor and the compressor rotor, a reduction gearing positioned between the compressor and the turbine but to one side of the common axis thereof, a tubular shaft encircling said shaft means, said tubular shaft at the end remote from said compressor being fast with the other of said independent rotors, said tubular shaft at the end adjacent said compressor having a driving connection with said reduction gearing, and an output shaft driven by said reduction gearing.

HORACE S. RAINBOW.

REFERENCES CITED

The following references are of record in the file of this patent:

FOREIGN PATENTS

| Number | Country | Date |
|---|---|---|
| 9,454 | Great Britain | Apr. 22, 1913 |

OTHER REFERENCES

"Flight," April 11, 1946, page 371.